H. S. GRIFFIN.
MEANS FOR SHOWING COLORS IN HARMONY OR CONTRAST.
APPLICATION FILED SEPT. 6, 1912.

1,057,546.   Patented Apr. 1, 1913.

WITNESSES

INVENTOR
Harry Stanley Griffin
BY Chas. A. Rutter,
ATTORNEY

UNITED STATES PATENT OFFICE.

HARRY STANLEY GRIFFIN, OF CAMDEN, NEW JERSEY, ASSIGNOR TO CHARLES ENEU JOHNSON & COMPANY, OF PHILADELPHIA, PENNSYLVANIA, A CORPORATION OF PENNSYLVANIA.

MEANS FOR SHOWING COLORS IN HARMONY OR CONTRAST.

1,057,546.  Specification of Letters Patent.  Patented Apr. 1, 1913.

Application filed September 6, 1912. Serial No. 718,794.

*To all whom it may concern:*

Be it known that I, HARRY STANLEY GRIFFIN, a citizen of the United States, and a resident of the city and county of Camden, State of New Jersey, have invented certain new and useful Improvements in Means for Showing Colors in Harmony or Contrast, of which the following is a specification.

My invention relates to improvements in means for showing various combinations of colors in harmony or contrast and is particularly intended for the use of those persons who have occasion to use colors and who may have to decide quickly as to the effect that will be produced by the use of two colors side by side, or in such close proximity that the eye will take them both in at once.

In carrying out my invention I employ two boards or sheets which are superposed and movable the one in relation to the other. The lower board is, preferably, the stationary one and has upon its upper face a number of spots of colors arranged in rows. For instance, the upper row would be in different shades of olive, the second row in different shades of green, the third row in different shades of orange, and so on. The upper board, in the present case the movable one, is, preferably, as much smaller than the lower board as twice the height of the rows of colors on the lower board and is perforated so as to expose to view the colors beneath it, the perforations being so made as to register perfectly, in any of the possible positions of the top board, with the row of colors upon the bottom board. The perforations in the top board are edged with colors which, in any of its possible movements, will be in harmony or contrast with the colors of the lower board, for instance the top row of perforations of the upper board are edged with different shades of maroon, the second row with different shades of purple, the third row with different shades of blue and so on. The colors edging other perforations are similarly chosen in relation to any colors upon the bottom board with which the several perforations may be brought in register and hence a person can determine at a glance a very great variety of two colors which will be properly in harmony or contrast.

My invention is illustrated in the accompanying drawings in which similar letters of reference indicate similar parts throughout the several views and in which—

Figure 1:
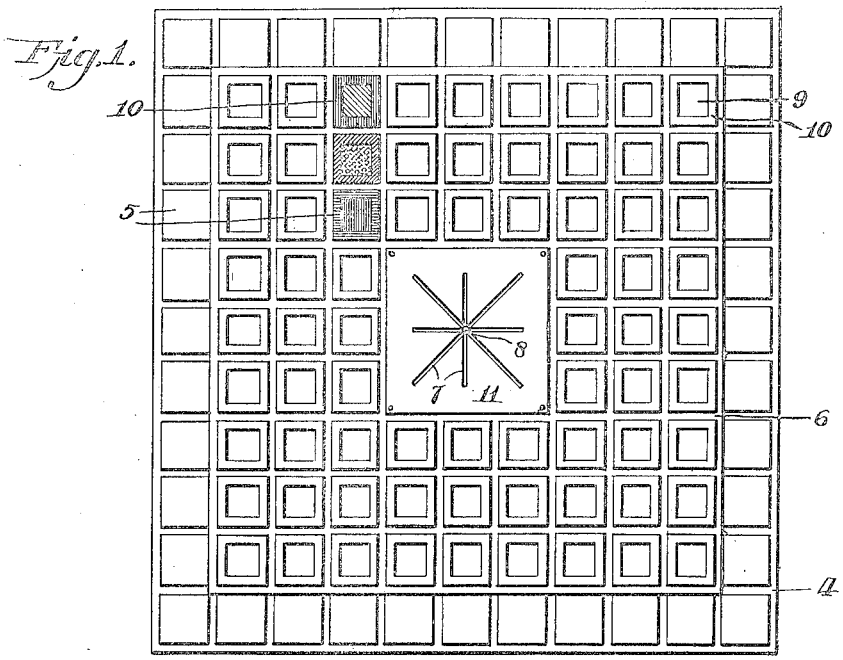
Figure 2:
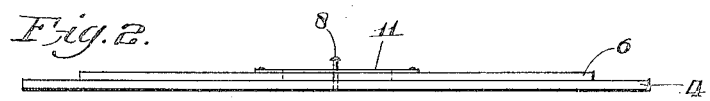
Figure 3:
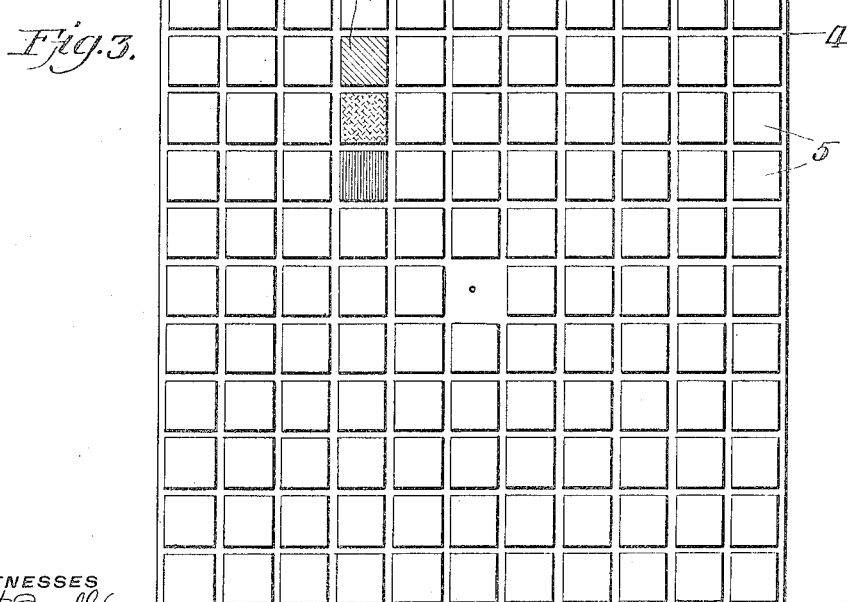

Figure 1, is a plan view of my completed device; Fig. 2, an end elevation of Fig. 1 and Fig. 3, a plan of the bottom board.

4 is the bottom board, which may be constructed of any suitable material, and which is, preferably, square in plan. Upon the bottom board, arranged in lines parallel to its edges, are squares or spots of colors 5 arranged successively in different shades—for instance the top row of colors are different shades of olive, the second row different shades of green, the third different shades of orange, and so on. The bottom board in the drawings is shown as carrying squares each one of which is of a different color or shade of color.

6 is the top board, also constructed of any suitable material. This board is also preferably square and when placed concentrically with the lower board is of such dimensions as to practically touch the inner sides of the outside rows of color squares or spots carried by the lower board as shown in Fig. 1. Radiating from the center of the top board 6 are two horizontal, two vertical and four diagonal slots 7 all of which communicate at the center of the board, and carried by the lower board and passing through the center of the upper board at the intersection of slots 7 when the two boards are concentrically placed, is a pin 8. The upper board is furnished with rows of perforations 9 placed so as to be in register with the squares or spots of colors upon the under board as shown in Fig. 1 and the slots 7 are of such a length that the upper board may be moved upward to bring the upper row of perforations 9 carried by this board in register with the upper row of squares or spots of colors carried by the lower board, downward to bring the lower row of perforations in register with the lower row of squares or spots upon the lower board, to the left or right or diagonally upward or downward to the left or right for a similar purpose. The perforations 9 of the upper board are edged with colors or shades of colors which will be in perfect harmony or contrast with any of the colors or shades of colors upon the lower board with which it is possible to move any perforation or row of perforations into register. For instance the upper row of perforations 9 are edged with different shades of maroon, the second with different shades of purple, the third with different shades of blue. The vertical movement of the upper board is so limited by the vertical slot 7 that it can be moved one step up, from the position shown in Fig. 1, to cause the upper row of perforations 9 to register with the upper, or olive colored, squares 5 or down so that this upper row of perforations will register with the third or orange colored row of spots 5. When in position shown in Fig. 1 it is in register with the second, or green, row of spots. The maroon edging 10 of the upper row of perforations will be in harmony with all colors upon the first three rows of squares or spots as will be also the purple and blue edgings of the second and third rows of perforations with the colors or shades of colors with which the slots of these rows will be brought in register. The same thing will follow for each of the possible nine positions of the upper board the colors and shades of colors upon the lower and upper boards being so arranged that no matter how these boards are moved, as described, it will be impossible to obtain any combination which will not be in either contrast or harmony.

The upper board is not to be swung around upon the pin 8 as a pivot but to be moved up or down, to the right or left or diagonally upward or downward to the right or left as may be permitted by pin 8, and slots 7.

As the upper board contains, in the present instance 72 perforations edged with as many colors or shades of colors, and as the lower board contains 120 squares or spots of different colors or shades of colors it will be seen that a very great number of contrasting or harmonious combinations, no two of which will be precisely alike, are possible with my device.

If necessary the central part 11 of the upper board carrying the slots 7 may be made of metal so as to reduce wear or these slots may have their edges covered or protected by metal or some other suitable material for this purpose.

Having thus described my invention I claim as new and desire to secure by Letters Patent:—

1. In a means for showing combinations of colors in harmony or contrast, in combination, two superposed boards the under of which carries rows of colors or shades of colors arranged in squares or spots, and the upper of which carries rows of perforations adapted to register with said squares or spots of colors, said perforations being edged with colors or shades of colors, and means for limiting the relative movement of said boards so that when said perforations are in register with said colors on the lower board the colors edging said perforations will be in harmony or contrast therewith.

2. In an apparatus of the character described, in combination, a board carrying colors or shades of colors arranged in squares or spots parallel to its edges, a superposed board arranged with rows of perforations edged with colors or shades of colors adapted to register with the squares or spots of colors on the lower board, said latter board being furnished with a perforation at its center and with slots connected with and radiating from said perforation, and a pin carried by the lower board and passing through one of said slots in said upper board, all substantially as and for the purposes set forth.

3. In an apparatus of the character described, in combination, a square board carrying squares or spots of colors or shades of colors arranged in rows parallel to its edges, a square board, superposed upon said first board, furnished with rows of perforations edged with colors or shades of colors, adapted to register with the squares or spots of colors upon said lower board and being furnished with eight slots radiating from its center as described, and a pin centrally carried by said lower board and passing through said slots, said pin and radiating slots so limiting the movement of said upper board that the colors edging the rows of perforations thereon can only be brought into harmony or contrast with the rows of colors on the lower board.

HARRY STANLEY GRIFFIN.

Witnesses:
EUGENE C. McCOLLEY,
CHARLES A. RUTTER.